(12) United States Patent
Leone (10) Patent No.: US 8,245,671 B2
(45) Date of Patent: Aug. 21, 2012

(54) OPERATING AN ENGINE WITH REFORMATE

(75) Inventor: Thomas G. Leone, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 176 days.

(21) Appl. No.: 12/756,883

(22) Filed: Apr. 8, 2010

(65) Prior Publication Data

US 2011/0137537 A1  Jun. 9, 2011

(51) Int. Cl.
*F02B 43/08* (2006.01)
(52) U.S. Cl. .............................................. 123/3
(58) Field of Classification Search .............. 123/3, 1 A, 123/2, 299; 429/423, 444; 60/286; 48/127.7; 701/104
See application file for complete search history.

(56) References Cited

U.S. PATENT DOCUMENTS

| | | | |
|---|---|---|---|
| 5,024,199 A * | 6/1991 | Abe | 123/674 |
| 5,176,122 A | 1/1993 | Ito | |
| 5,224,452 A | 7/1993 | Tomizawa | |
| 5,372,411 A | 12/1994 | Gerstenmaier et al. | |
| 5,445,019 A | 8/1995 | Glidewell et al. | |
| 5,526,797 A | 6/1996 | Stokes | |
| 5,542,394 A | 8/1996 | Tomisawa | |
| 5,633,458 A | 5/1997 | Pauli et al. | |
| 5,682,864 A | 11/1997 | Shirakawa | |
| 5,740,667 A | 4/1998 | Bhattacharyya et al. | |
| 5,762,366 A | 6/1998 | Faye | |
| 5,857,445 A | 1/1999 | Shimada et al. | |
| 6,024,069 A | 2/2000 | Yoshino | |
| 6,058,906 A | 5/2000 | Yoshino | |
| 6,088,647 A | 7/2000 | Hemberger et al. | |
| 6,155,212 A * | 12/2000 | McAlister | 123/3 |
| 6,176,215 B1 | 1/2001 | Baur et al. | |
| 6,213,104 B1 | 4/2001 | Ishikiriyama et al. | |
| 6,247,449 B1 | 6/2001 | Persson | |
| 6,318,306 B1 | 11/2001 | Komatsu | |
| 6,334,424 B1 | 1/2002 | Ito | |
| 6,349,702 B1 | 2/2002 | Nishiyama | |
| 6,390,030 B1 | 5/2002 | Isogawa et al. | |
| 6,422,004 B1 * | 7/2002 | Takami et al. | 60/285 |

(Continued)

FOREIGN PATENT DOCUMENTS

EP 2 048 339 A1 4/2009

OTHER PUBLICATIONS

Leone, Thomas G., et al., "Method for Operating a Charge Diluted Engine" U.S. Appl. No. 12/756,822, filed Apr. 8, 2010, FGT093217U01, 87 Pgs.

(Continued)

*Primary Examiner* — Noah Kamen
*Assistant Examiner* — Long T Tran
(74) *Attorney, Agent, or Firm* — Julia Voutyras; Alleman Hall McCoy Russell & Tuttle LLP (57) ABSTRACT

The present description relates to operation and control of a fuel reformer. In one embodiment, an engine constituent is adjusted in response to limiting an amount of reformate supplied to the engine during a condition of reformer degradation. The approach can improve engine operation. In this way, consequences of reformate system degradation may be reduced by limiting use of the reformate system after degradation is detected.

17 Claims, 7 Drawing Sheets

U.S. PATENT DOCUMENTS

| | | | |
|---|---|---|---|
| 6,591,817 | B2 | 7/2003 | Deutsch |
| 6,705,295 | B1 | 3/2004 | Tarroux et al. |
| 6,711,893 | B2 | 3/2004 | Ueda et al. |
| 6,729,301 | B2 | 5/2004 | Nakamori et al. |
| 6,751,543 | B2 | 6/2004 | Gras et al. |
| 6,851,398 | B2 | 2/2005 | Taylor, III et al. |
| 6,964,261 | B2 | 11/2005 | Warne et al. |
| 6,988,481 | B2 | 1/2006 | Sen et al. |
| 6,990,956 | B2 | 1/2006 | Niimi |
| 6,997,142 | B2 | 2/2006 | Wakao et al. |
| 7,028,655 | B2 * | 4/2006 | Wakao et al. ............ 123/179.14 |
| 7,047,940 | B2 | 5/2006 | Niimi |
| 7,089,888 | B2 | 8/2006 | Mirji |
| 7,104,244 | B2 | 9/2006 | Nishi et al. |
| 7,159,541 | B2 | 1/2007 | Wakao et al. |
| 7,203,579 | B2 | 4/2007 | Yokota et al. |
| 7,228,841 | B2 | 6/2007 | Takemoto et al. |
| 7,261,065 | B2 | 8/2007 | Aimoto et al. |
| 7,370,609 | B2 | 5/2008 | Kamio |
| 7,448,348 | B2 * | 11/2008 | Shinagawa et al. ................ 123/3 |
| 7,454,898 | B2 | 11/2008 | Allgeier et al. |
| 7,523,744 | B2 | 4/2009 | Ayame |
| 7,530,335 | B2 | 5/2009 | Sakurai et al. |
| 2001/0003977 | A1 | 6/2001 | Hayashi et al. |
| 2004/0139944 | A1 | 7/2004 | Nakano et al. |
| 2005/0045118 | A1 * | 3/2005 | Wakao et al. ..................... 123/3 |
| 2007/0204813 | A1 * | 9/2007 | Arai et al. .................... 123/25 A |
| 2008/0010993 | A1 | 1/2008 | Morgenstern |
| 2008/0098985 | A1 | 5/2008 | Kamio |
| 2008/0141984 | A1 | 6/2008 | Haga |
| 2008/0221778 | A1 | 9/2008 | Kakuho et al. |
| 2008/0228375 | A1 | 9/2008 | Ashida et al. |
| 2008/0282998 | A1 | 11/2008 | Kuzuoka et al. |
| 2008/0314020 | A1 * | 12/2008 | Hoard et al. .................... 60/274 |
| 2009/0017987 | A1 | 1/2009 | Satou et al. |
| 2009/0030588 | A1 | 1/2009 | Yamashita |
| 2009/0043479 | A1 | 2/2009 | Noda et al. |
| 2009/0065409 | A1 | 3/2009 | Kamio et al. |
| 2009/0071453 | A1 | 3/2009 | Stockhausen et al. |

OTHER PUBLICATIONS

Leone, Thomas G., et al. "Method for Operating and Engine with Variable Charge Density" U.S. Appl. No. 12/756,800, filed Apr. 8, 2010, FGT093217UO2, 87 Pgs.

Leone, Thomas G., et al., "Pump Control for Reformate Fuel Storage Tank" U.S. Appl. No. 12/756,827, filed Apr. 8, 2010, FGT093219, 24 Pgs.

Czekala, Michael D., et al., "Ignition Control for Reformate Engine" U.S. Appl. No. 12/756,792, filed Apr. 8, 2010, FGT093220, 32 Pgs.

Pursifull, Ross D., "Fuel Injector Diagnostic for Dual Fuel Engine" U.S. Appl. No. 12/756,838, filed Apr. 8, 2010, FGT093221, 35 Pgs.

Pursifull, Ross D., "Engine Fuel Reformer Monitoring" U.S. Appl. No. 12/756,845, filed Apr. 8, 2010, FGT093222, 37 Pgs.

Gopichandra, Surnilla, et al., "Method for Improving Transient Engine Operation" U.S. Appl. No. 12/756,784, filed Apr. 8, 2010, FGT093223, 77 Pgs.

Leone, Thomas G., et al., "Method for Operating a Vehicle with a Fuel Reformer" U.S. Appl. No. 12/756,892, filed Apr. 8, 2010, FGT093225, 86 Pgs.

Pursifull, Ross D., "Method for Operating an Engine" U.S. Appl. No. 12/756,809, filed Apr. 8, 2010, FGT093226, 87 Pgs.

Pursifull, Ross D., et al., "Selectively Storing Reformate" U.S. Appl. No. 12/756,853, filed Apr. 8, 2010, FGT093229, 33 Pgs.

Leone, Thomas G., "Reformate Control Via Accelerometer" U.S. Appl. No. 12/756,897, filed Apr. 8, 2010, FGT093230, 33 Pgs.

Kerns, James, et al., "Method for Operating an Engine with a Fuel Reformer" U.S. Appl. No. 12/756,858, filed Apr. 8, 2010, FGT093231, 33 Pgs.

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 Pgs.

Hoffmann, Walter, et al., "A New Approach to Ethanol Utilization: High Efficiency and Low Nox in an Engine.Operating on Simulated Reformed Ethanol", SAE Technical Paper Series No. 2008-01-2415, Powertrain, Fuels, & Lubricants Meeting, Rosemont, IL, Oct. 6-9, 2008, 11 Pgs.

Morgenstern, David A., et al., "Low Temperature Reforming of Ethanol over Copper-Plated Randy Nickel: A New Route to Sustainable Hydrogen for Transportation" revised manuscript received May 4, 2005, pp. 9.

Green Car Congress, "Honda Making Significant Progress on HCCI Engine for Hybrid Application" Oct. 28, 2009, http://www.greencarcongress.com/2005/10/honda_making_si.html, 8 Pgs.

* cited by examiner

OPERATING AN ENGINE WITH REFORMATE

TECHNICAL FIELD

The present application relates to control and management of engine systems including and related to a fuel reformer.

BACKGROUND AND SUMMARY

A reformer may convert a liquid fuel such as gasoline, diesel fuel, ethanol, etc. into a reformate gas so that the reformate gas can be combusted by an engine to improve combustion stability, knock resistance, and heating value. Further, reformed fuel may be used to purge or reduce constituents held or stored by an exhaust gas after treatment device. In one example, a reformate system may include a buffer tank, cooler, vaporizer, storage vessel, and gaseous injector to facilitate reformate use by a vehicle engine.

The inventor herein recognizes various issues that may develop with engine and reformate systems. For example, as the number and complexity of components in a reformate system increases, an engine may need to operate under conditions both with and without reformate. In an engine designed to utilize reformate gas, such modes may differ from those of conventional engines. In one example, a low supply of reformate gas could result in engine misfire. In a further example, a degradation of a reformate system component may lead to increased emissions or less efficient engine combustion. Therefore, the present description provides methods and systems for operating an engine utilizing reformate gaseous fuel are described. In one example, a method of operating an engine, comprising: limiting reformate flow to said engine in response to degradation of a fuel reformer; reducing an engine constituent proportionate to said limiting reformate flow; and increasing an amount of liquid fuel delivered to said engine to maintain engine torque and an air-fuel ratio of said engine prior to said limiting reformate flow.

One advantage of the above method is that consequences of reformate system degradation may be reduced by limiting use of the reformate system after degradation is detected. For example, if the reformate system is providing less than a threshold amount of reformate, reformer operation can be limited so that less energy is consumed by operating the reformer and so that the engine does not continue to operate as if a higher amount of reformate is available. Further, by adjusting liquid fuel supplied to an engine as well as engine constituents (e.g., charge dilution and/or boost) reasonable engine performance may be maintained. In this way, engine operation may be maintained at a reasonable level.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
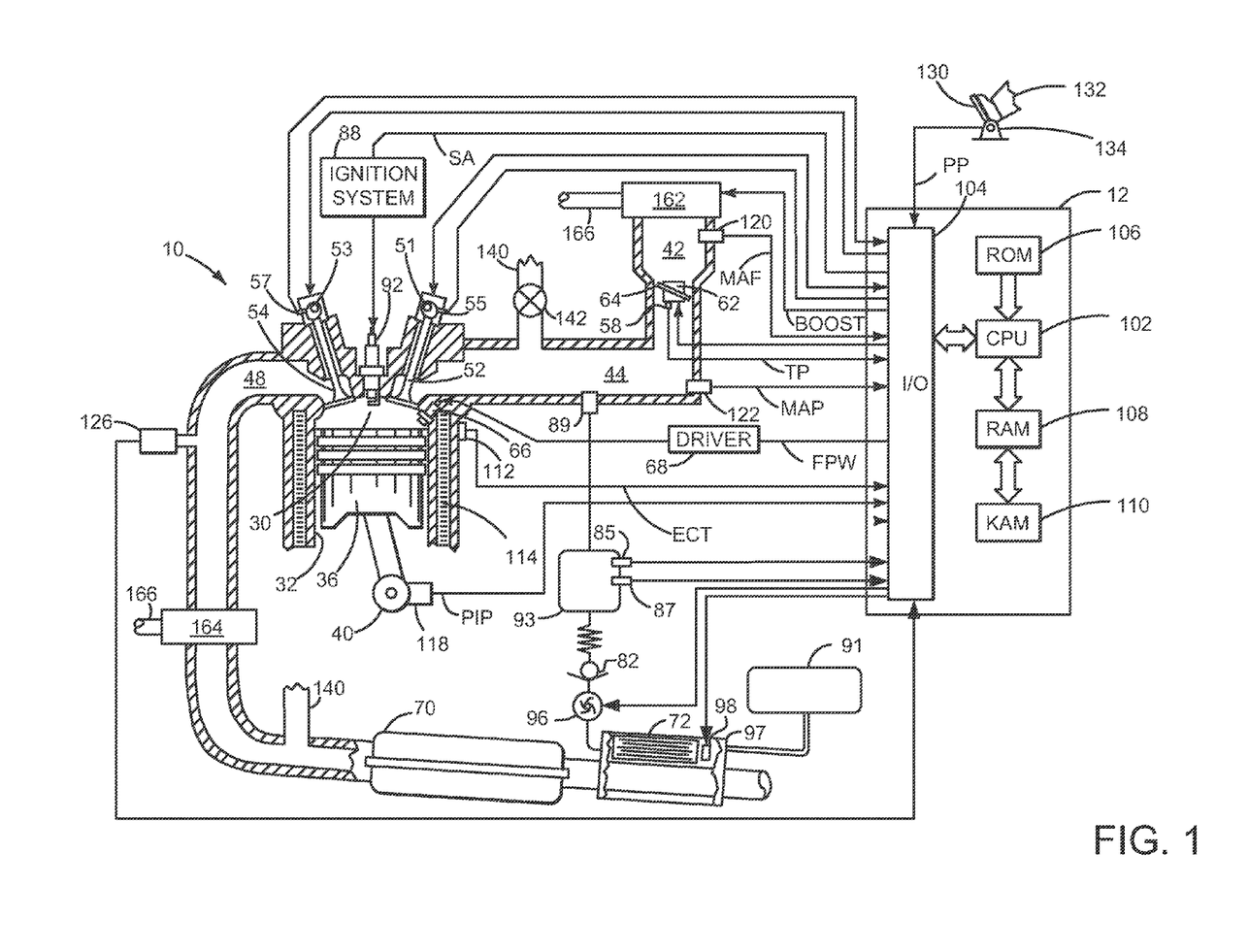
FIG. 1 shows a first example engine including a reformate system.
Figure 2:
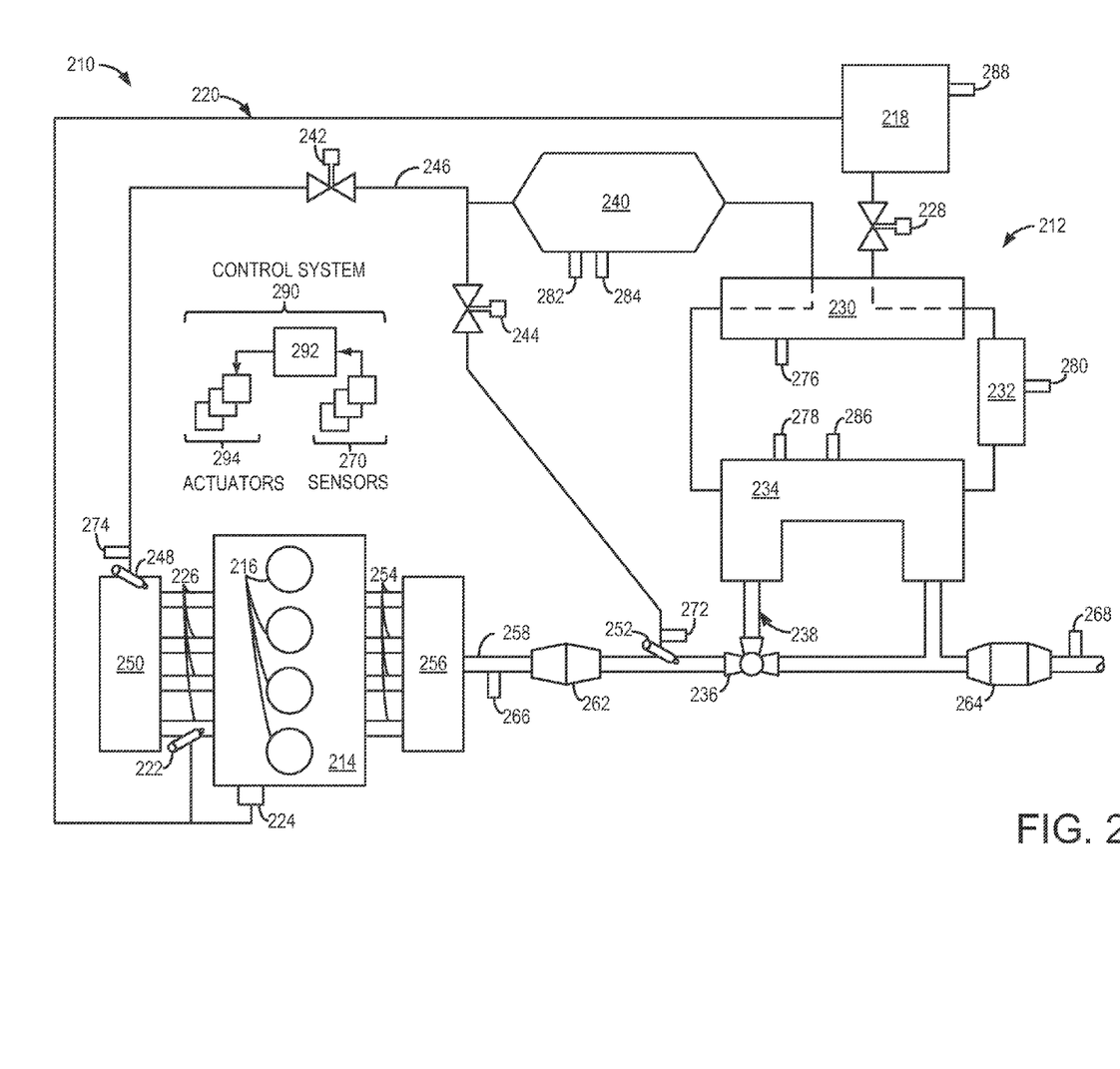
FIG. 2 shows a second example engine including a reformate system.

Devices, systems and methods are described herein, including detection modes for an example engine equipped with a reformer. First, example engines including reformate systems are shown in FIGS. 1 and 2. Then exemplary routines are described with reference to FIGS. 3-7 as example methods for control of such engines.

Turning to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system including fuel tank 91 (which may be a liquid fuel tank), fuel pump (not shown), fuel lines (not shown), and fuel rail (not shown). The engine 10 of FIG. 1 is configured such that the fuel is injected directly into the engine cylinder, which is known to those skilled in the art as direct injection. Alternatively, liquid fuel may be port injected. Fuel injector 66 is supplied operating current from driver 68 which responds to controller 12. In addition, intake manifold 44 is shown communicating with optional electronic throttle 64. In one example, a low pressure direct injection system may be used, where fuel pressure can be raised to approximately 20-30 bar. Alternatively, a high pressure, dual stage, fuel system may be used to generate higher fuel pressures.

Gaseous fuel may be injected to intake manifold 44 by way of fuel injector 89. In another embodiment, gaseous fuel may be directly injected into cylinder 30. Gaseous fuel is supplied to fuel injector 89 from storage tank 93 by way of pump 96 and check valve 82. Pump 96 pressurizes gaseous fuel supplied from fuel reformer 97 in storage tank 93. Check valve 82 limits flow of gaseous fuel from storage tank 93 to fuel reformer 97 when the output of pump 96 is at a lower pressure than storage tank 93. Fuel reformer 97 includes catalyst 72 and may further include optional electrical heater 98 for reforming liquid fuel supplied from fuel tank 91. Fuel reformer 97 is shown coupled to the exhaust system downstream of catalyst 70 and exhaust manifold 48. However, fuel reformer 97 may be coupled to exhaust manifold 48 and located upstream of catalyst 70. For example, fuel reformer 97 may use a catalyst and exhaust heat to drive an endothermic dehydrogenation of alcohol supplied by fuel tank 91 to promote fuel reformation.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

In some examples, engine 10 may include a compression device to provide boost, as a turbocharger or supercharger. Such a device includes at least a compressor 162 arranged along intake manifold 44. For a turbocharger, compressor 162 may be at least partially driven by a turbine 164 (e.g. via a shaft 166) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12, and sent via signal BOOST. Further, compressor 162 may include a compressor bypass valve (not shown) and turbine 164 may include a waste gate (also not shown) to control pressure in one or more passage of the engine (e.g., intake passage 42, manifold 44, and exhaust passage 48).

Further, in the disclosed embodiments, an exhaust gas recirculation (EGR) system may route a desired portion of exhaust gas from exhaust passage 48 to intake manifold 44 (and/or in intake passage 42) via EGR passage 140. The amount of EGR provided to intake passage 48 may be varied by controller 12 via EGR valve 142. Further, an EGR sensor (not shown) may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of reformer tank temperature from temperature sensor 87; a measurement of reformer tank pressure from pressure sensor 85; a measurement of reformer tank temperature from temperature sensor 87; a measurement of air mass entering the engine from sensor 120; and a measurement of throttle position from sensor 62. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Next, FIG. 2 shows a second example engine 210 including a reformate system 212. Engine 210 may be included in an example vehicle. Further, engine 210 includes an engine block 214 defining and enclosing a plurality of cylinders 216, each of which may receive one or more liquid and gaseous fuels.

Liquid fuel tank 218 stores a liquid fuel that may be a blend of ethanol and gasoline, as described above. In other examples, the liquid fuel may contain methanol or other alcohol and/or gasoline and/or diesel fuel. A fuel pump (not shown) may increase pressure and direct fuel in fuel line 220 to an example port fuel injector 222 or fuel rail 224. Fuel rail 224 may be in fluid communication with one or more injectors in communication with cylinders 216. Further, the present example only shows one port injector 222 coupled to one of the plurality of intake runners 226. In additional examples, each of the intake runners 226 has a port injector 222 coupled to it.

Liquid fuel including ethanol may also be reformed, for example, into reformate gas, as described briefly with respect to FIG. 1. A first reformate valve 228 allows liquid fuel to be pumped to cooler 230 and continue to a vaporizer 232 before entering an example reformer 234 (which includes a catalyst—not shown, but described above with respect to FIG. 1). In the present example, waste heat from engine exhaust gases may be directed by exhaust diverter valve 236 to exhaust passage loop 238, which is in thermal communication with the catalyst included in reformer 234. In the present example, liquid fuel reformed into gas at reformer 234 then flows back through cooler 230 and on to a buffer tank 240 (dashed lines indicate the different paths of liquid fuel and reformate gas in the cooler).

Second reformate valve 242 and third reformate valve 244 control flow through gaseous fuel line 246. Gaseous fuel line is coupled to gaseous injector 248, which itself is coupled to intake manifold 250. Intake manifold 250 may receive air from an intake passage, example compressor, air intake system, etc. and mix air with reformate gas injected via injector 248.

In the present example, gaseous fuel line 246 also includes an optional exhaust reformate injector 252. Exhaust gases from cylinders 216 are directed via a plurality of exhaust runners 254 to an exhaust manifold 256 and then to an exhaust passage 258. The present example includes an exhaust passage 258 including a first exhaust after treatment device 262 (e.g., a three-way catalyst), and a second exhaust after treatment device 264 (e.g., a lean NOx trap). Further, in the present example, exhaust reformate injector 252, diverter valve 236 to exhaust passage loop 238 are intermediate the first and second exhaust after treatment devices 262 and 264, respectively. Reformate may be leaked or injected into the exhaust passage 258 upstream of after treatment device 264, thereby increasing a concentration of hydrocarbons (HC) and/or other combustible gases in the exhaust. The reformate may assist with purging the second exhaust after treatment device 264 (as discussed in more detail below with respect to FIG. 7).

A first exhaust gas sensor 266 is positioned intermediate first exhaust after treatment device 262 and exhaust manifold 256 (e.g., upstream of exhaust after treatment device 262), and a second exhaust gas sensor 268 is positioned adjacent second exhaust after treatment device 264 (e.g., downstream of exhaust after treatment device 264). Alternatively, exhaust gas sensor 268 may be placed upstream of after treatment device 264. Exhaust oxygen and/or HC levels may be indicated by each exhaust gas sensor 266 and 268, and may be used to determine degradation of the reformate system 212.

Further, exhaust gas sensors 266 and 268 are included in sensors 270. Sensors 270 further include sensors 272, 274, 276, 278, 280, 282 which may be temperature and/or pressure sensors coupled in the reformate system. Such pressure sensors may be configured to identify degradation based on a pressure less than a first pressure threshold or greater than a second pressure threshold. Further, such temperature sensors may be configured to identify degradation based on a temperature less than a first temperature threshold or greater than a second temperature threshold. Further, sensors 270 may include other sensors not listed, such as exhaust gas temperature sensors upstream and/or downstream of the reformate system 234.

Further, buffer tank 240 includes a fuel composition sensor 284, reformer 234 includes fuel composition sensor 286, and liquid fuel tank 218 includes fuel composition sensor 288. The output of fuel composition sensors may be used to identify fuel reformer degradation by control system 290 based on a fuel composition below a first fuel composition threshold or above a second fuel composition threshold.

A control system 290 includes sensors 270, a controller 292, and actuators 294 (which includes, e.g., an example throttle, example engine valves, exhaust diverter valve 236, first, second and third reformate valves 228, 242 and 244 respectively, etc.). In the present example, the controller includes instructions on a recordable medium. Further, engine 210 and reformate system 212 may be configured to limit fuel flow between at least one of liquid fuel tank 218 and fuel reformer 234 and between intake manifold 250 and the gaseous fuel injector 248 in response to a degradation indicated by at least one of the pressure sensors, the temperature sensors, the exhaust oxygen sensors, the exhaust hydrocarbon sensors, and the fuel composition sensors. Further, in response to degradation engine charge dilution may be reduced by reducing an amount of EGR, adjusting valve timing, and/or by richening an air-fuel mixture of the engine. Further still, boost provided by a compressor in communication with the intake manifold 250 may be limited by adjusting a waste gate, vane position, drive ratio, or clutch. Further still, an amount of liquid fuel delivered to one or more cylinders 216 of the engine 210 may be increased in response to a condition of degradation of fuel reformer 234.

Thus, the system of FIG. 2 provides for operating an engine with a fuel reformer, comprising: a fuel reformer; a pressure sensor in communication with said fuel reformer; a temperature sensor in communication with said fuel reformer; a fuel composition sensor in communication said fuel reformer; and a controller with instructions to gradually reduce reformate flow from said fuel reformer to said engine during a first degradation condition of said fuel reformer, immediately stop reformate flow from said fuel reformer to said engine during a second degradation condition of said fuel reformer, and reduce an engine constituent in proportion to an amount of reformate flow reduced to said engine during said first and second degradation conditions of said fuel reformer. The system further comprising instructions for decreasing reformate flow during an operator throttle tip-out during degradation of said fuel reformer.

Figure 3:
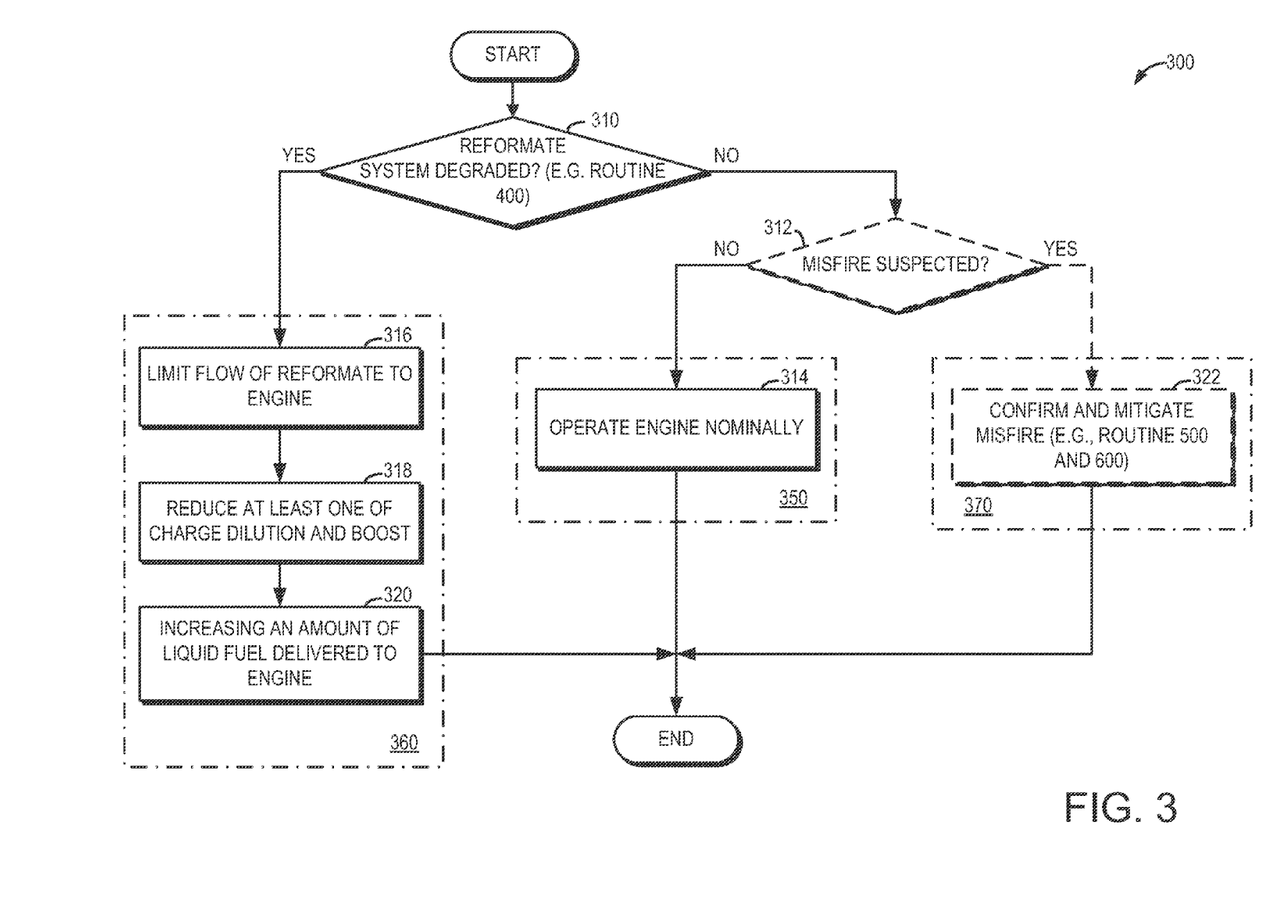
FIG. 3 shows an example higher level routine for operating an engine.

Turning now to FIG. 3, a first routine 300 is shown. Routine 300 is one example of a higher level routine for operating an engine and related systems, for example a reformate system. Routine 300 may be instructions stored in a readable memory and included in an example engine controller. Routine 300 is one example of a method for determining and responding to a degradation of an example reformate system. Further, routine 300 is one example of a method for determining and operating an example engine in one of a plurality of operating modes, where one of the plurality of modes includes a degraded reformate system. Further still, routine 300 may be run repeatedly, after discrete time intervals, in response to queues, triggers, etc. for continuous or periodic monitoring and control.

In the present example routine 300 includes judging if an example reformate system is degraded at 310. One example of determining if the reformate system is degraded is described below with respect to routine 400 of FIG. 4. Determining if the reformate system is degraded includes, for example, a determination if a pressure in the reformate system is above a pressure threshold or below a pressure threshold. Further, the determination may include judging if a temperature in the reformer system is above or below a temperature threshold. Further still, the determination may include if a fuel quality and/or chemical content is above a quality threshold or below a threshold. If the reformate system is judged to be degraded, routine 300 proceeds to 316. Otherwise, routine 300 proceeds to 312.

In the present example, routine 300 judges if misfire is suspected at 312. Determining if misfire is suspected is an optional step and is shown with a dashed outline to indicate its optional nature. Further, 312 is discussed in more detail below.

In examples where routine 300 does not include determining if misfire is suspected, routine 300 continues to 314 where the engine is operated nominally. Nominal operation may include injecting gaseous reformate to the engine, injecting liquid fuel to the engine at a first level, combusting at a first air-to-fuel ratio, a reformate charge dilution level, a reformate boost level, and a reformate spark timing. Nominal operation may change depending on an example operator's input (e.g., via an example input device), engine temperature, exhaust oxygen level, etc. Further, nominal operation may be included as part of a first mode (e.g., at dash-dot box 350). After selecting nominal operation, routine 300 may end.

In response to determining that an example reformate system is degraded at 310, routine 300 continues to 316, limiting flow of reformate to the example engine. Limiting flow of reformate includes at least one of stopping a flow of liquid fuel from an example liquid fuel tank to an example reformer, stopping a flow of reformate gas from an example gaseous injector to an example manifold, stopping flow at any point intervening the liquid fuel tank and the manifold (for example, between the cooler and the liquid fuel tank of FIG. 2), and stopping a flow of exhaust gas through an example reformer. In this way, reformate product and/or consumption of reformate by the engine may be halted or reduced. In another example, the rate reformate is supplied to the engine may be reduced during a condition of reformer degradation. For example, if the fuel reformer is outputting reformate at a rate less than a threshold level, the amount of reformate supplied to the engine or an exhaust after treatment device may be reduced. In one example, the reformate may be reduced proportional to a proportion of reformate produced by the fuel reformer. For example, if the reformer is supplying reformate at a rate of 50% of a threshold rate, then the amount of reformate supplied to the engine may be reduced by 50% or some other proportional amount.

After 316, routine 300 continues to 318 which includes reducing at least one of cylinder charge dilution and boost. Reducing charge dilution can increase charge combustibility and may compensate for the reduced reformate delivered to the engine. Further, limiting boost can reduce the engine knock threshold level by reducing cylinder pressure. After 318, routine 300 continues to 320, which includes increasing an amount of liquid fuel delivered to engine. Increasing the amount of liquid fuel delivered to the engine may maintain an air-fuel ratio of the engine prior to the limiting of reformate flow. In further examples, increasing liquid fuel delivered to engine may enrich the air-fuel ratio in comparison to the air-fuel ratio of prior to the limiting of reformate flow. Enriching air-fuel ratio may increase charge combustibility in one or more cylinders of the example engine and may compensate for the decreased reformate delivered to the engine. Further, the amount of liquid fuel injected to the engine can be increased so that the amount of engine torque delivered before reformate flow to the engine was limited is maintained. In one example, the amount of liquid fuel increase is proportional to the amount of reformate fuel decrease during reformer degradation.

316, 318 and 320 are included in a second operating mode (as indicated by dash-dot box 360). Because second mode 360 takes place in response to a degradation (determined at 310), second mode 360 includes a degradation of the example reformate system included in the example engine, limiting injecting gaseous reformate (at 316), injecting liquid fuel at a second level (at 320) greater than a first level in the first mode 350, and combusting at a second air-fuel mixture at a ratio less than the first (e.g., richening). In further examples of routine 300, only one or two of 316, 318 and 320 are included in the routine and/or in second mode 360. After second mode 360, routine 300 ends in the present example.

In some examples of routine 300, determining that there is not a degradation of the reformate system at 310 includes not only direct sensing of the reformate system, but additional engine sensors, such as an example exhaust gas sensor, or an engine speed sensor to monitor engine speed. In additional examples, determining that there is not a degradation of the reformate system at 310 only includes direct sensing of the reformate system. In some examples, routine 300 may include determining if a misfire is a consequence of reformer degradation. A suspected misfire may be confirmed by a crankshaft acceleration above a crankshaft acceleration threshold, an engine speed below an engine speed threshold, an exhaust oxygen concentration above an exhaust oxygen threshold, an exhaust hydrocarbon concentration above an exhaust hydrocarbon threshold, an engine output torque below a demanded torque threshold, a short circuit or open circuit in an ignition system, etc. If engine misfire is suspected at 312, routine 300 may continue to confirming and mitigating misfire at 322. Examples of confirming and mitigating misfire are discussed below with respect to FIGS. 5 and 6. Furthermore, in the present example 322 is included in a third mode (indicated by dash-dot box 370). The third mode may include increasing an amount of gaseous reformate delivered to the example engine over a first amount injected in said first mode, and a misfire indicated by at least one of a persistently lean air-to-fuel ratio (e.g., a lean cylinder mixture for more than a predetermined number of engine cycles), a persistently rich air-to-fuel ratio at an exhaust gas sensor (e.g., a rich cylinder mixture for more than a predetermined number of engine cycles), and said engine speed below an engine speed threshold. In the present example, after 322, routine 300 ends.

Thus, the method of FIG. 3 provides for operating an engine, comprising: limiting reformate flow to said engine in response to degradation of a fuel reformer; reducing an engine constituent proportionate to said limiting reformate flow; and increasing an amount of liquid fuel delivered to said engine to maintain engine torque and an air-fuel ratio of said engine prior to said limiting reformate flow. Further, the method where said engine constituent is a cylinder dilution amount or an amount of boost. The method further comprising where said degradation includes a symptom of lean or rich engine air-fuel or a fuel correction amount greater than a predetermined amount. The method further comprising where degradation includes a pressure in said reformate system less than a first pressure threshold or greater than second pressure threshold. The method further comprising indicating said pressure greater than said first pressure threshold or less than said second pressure threshold via a pressure sensor measuring at least one of a reformate system cooler, vaporizer, reformer, buffer tank, gaseous injector and a reformate supply line coupled intermediate reformate system components. The method where degradation includes a temperature of a reformate system component less than a first temperature threshold or greater than a second temperature threshold. The method further comprising indicating said temperature less than said first temperature threshold or greater than said second temperature threshold via a temperature sensor measuring at least one of a reformate system cooler, vaporizer, reformer catalyst, buffer tank, gaseous injector and a reformate supply line coupled intermediate reformate system components. The method where said degradation includes a fuel composition below a first fuel composition threshold or above a second fuel composition threshold, and where limiting reformate includes reducing reformate flow to said engine in proportion to a proportion of reformate produced by said fuel reformer. The method further comprising, indicating said fuel composition below said fuel composition threshold via a fuel composition sensor measuring chemical composition of fuel in a liquid fuel tank, buffer tank, or reformer. The method where limiting flow of reformate to said engine includes stopping injection of reformate via a gaseous fuel injector. The method including limiting reformate flow to said engine includes stopping flow of liquid fuel from a fuel tank to a reformer. The method including limiting reformate flow to said engine including stopping flow of exhaust gas to a reformer.

The method of FIG. 3 also provides for a first mode including operating an engine at a first speed and load, injecting gaseous reformate to said engine, injecting liquid fuel to said engine in a first amount and combusting an air-fuel mixture comprising said gaseous reformate and liquid fuel; and a second mode including operating said engine at substantially said first speed and load, a degradation of a reformate system, limiting injecting of said gaseous reformate, injecting said liquid fuel in a second amount greater than said first amount, and combusting at a second air-fuel mixture comprising at least said liquid fuel. The method where the second mode further comprises stopping flow of liquid fuel from a fuel tank to a fuel reformer. The method where said degradation in the second mode includes a temperature sensor coupled to a reformer, said sensor indicating a temperature greater than a second temperature threshold. The method where said degradation includes a pressure sensor coupled to a buffer tank, said sensor indicating a pressure greater than a second pressure threshold. The method where said degradation includes a fuel composition sensor coupled to a liquid fuel tank, said sensor indicating a fuel composition amount below a composition threshold. The method further comprising a third mode including, a misfire of a cylinder in said engine, and increasing an amount of gaseous reformate delivered to said engine over a first amount injected in said first mode. The method further comprising where said misfire is indicated by a lean or rich air-fuel ratio or by a change in engine speed or by a crankshaft acceleration above a threshold level.

Figure 4:
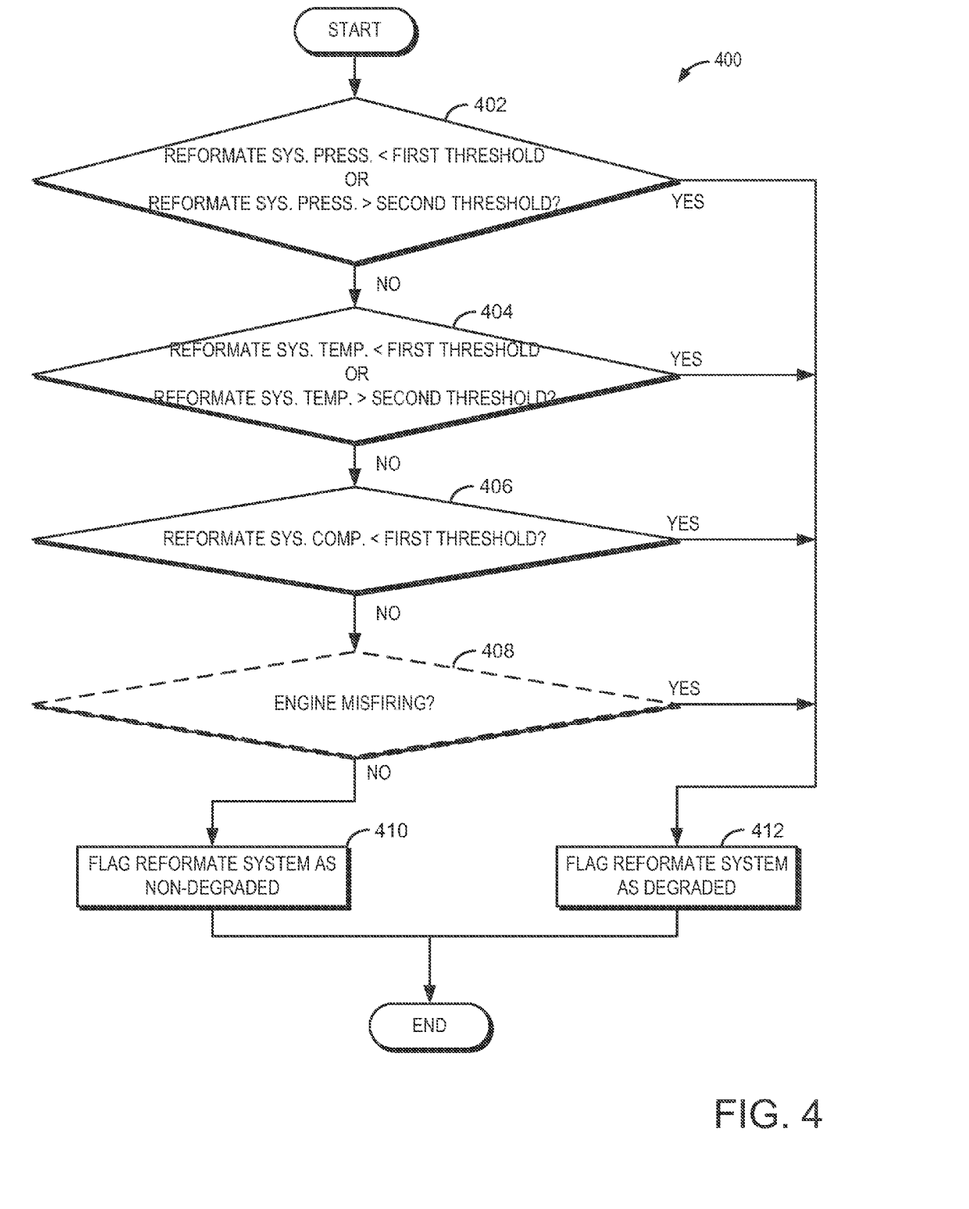
FIG. 4 shows an example routine for determining if a reformate system is degraded.

Turning now to FIG. 4 an example routine 400 for determining if a reformate system is degraded, is shown. In one example, routine 400 may be a subroutine of another routine (e.g., at 310 of routine 300 discussed above with respect to FIG. 3). Routine 400 starts at 402, where it is judged if a pressure in the reformate system is less than a first pressure threshold or greater than second pressure threshold. For example, 402 may include indicating that pressure is less than said first pressure threshold or greater than the second pressure threshold via a pressure sensor measuring pressure in at least one of a reformate system cooler, vaporizer, reformer, buffer tank, gaseous injector and a reformate supply line coupled intermediate reformate system components. If a pressure in the reformate system is not less than a first threshold pressure, or if pressure in the reformate system is not greater than a second threshold pressure, routine 400 continues to 404. Otherwise, routine 400 proceeds to 412. Of course, the pressures and pressure thresholds may be different for different portions (e.g., reformer inlet and outlet pressures) and/or components of the fuel reformer.

At 404, routine 400 determines if a temperature of the reformate system is less than a first temperature threshold or if a temperature of the reformate system is greater than a second temperature threshold. The temperature may include one or more of a temperature of engine exhaust entering the fuel reformer, the temperature of engine exhaust exiting the fuel reformer, a temperature of a fuel entering the fuel reformer, a temperature of fuel exiting the fuel reformer, a temperature of vapor or of a vaporizer, a temperature of a vapor cooler, temperature of fuel vapors in a buffer tank, temperature of reformate in fuel lines or injectors. The before mentioned temperatures may be measured by temperature sensors or inferred from other sources. If a temperature in the reformate system is not less than a first threshold temperature or if temperature in the reformate system is not greater than a second threshold temperature, routine 400 continues to 406. Otherwise, routine 400 proceeds to 412. Of course, the temperatures and temperature thresholds may be different for different portions and/or components of the fuel reformer.

At 406, routine 400 judges if the composition of fuel converted to reformate after being processed by the fuel reformer is less than a threshold composition. In one example, if the amount of reformate exiting the fuel reformer is less than a threshold amount for a predefined amount of fuel entering the fuel reformer, routine 400 proceeds to 412. Otherwise, routine 400 proceeds to 408. Thus, in one example, if the efficiency of the fuel reformer is less than a threshold, routine 400 proceeds to 412. The fuel composition may be sensed by a hydrocarbon sensor or by a CO sensor for example. In another example, 406 may include judging if fuel composition of liquid fuel delivered to the reformate system is above a first fuel composition threshold or below a second fuel composition threshold. For example, some reformate systems may only be effective at converting alcohol to reformate gas, and such systems may be degraded if supplied with a liquid fuel of low alcohol content or high gasoline content.

At 408, routine 400 judges if engine misfire is occurring. In one example, engine misfire may be determined from oxygen sensors in the exhaust path of the engine. On the other hand, engine misfire may be detected from changes in the instantaneous engine speed or crankshaft acceleration, or from cylinder pressure transducers. If routine 400 judges the presence of engine misfire, routine 400 proceeds to 412. Otherwise, routine 400 proceeds to 410.

At 410, routine 400 indicates that the reformate system is not operating under degraded conditions. In one example, a bit may be set in an engine controller to indicate lack of a degraded fuel reformer. Routine 400 proceeds to exit once the non-degradation flag is set.

At 412, routine 400 sets a flag indicating degradation of the fuel reformer system. In one example, a bit may be set in an engine controller to indicate degradation of a fuel reformer. Once the flag indicating a degraded fuel reformer is set, adjustments and/or mitigating control actions may be taken by peripheral systems. For example, if it is judged that reformer operation is degraded, a routine may adjust cylinder valve timing, boost pressure, cylinder dilution, spark advance, waste gate position, fuel injection timing, and liquid fuel amount to compensate for a degraded fuel reformer. Routine 400 proceeds to exit once the degradation flag is set.

Figure 5:
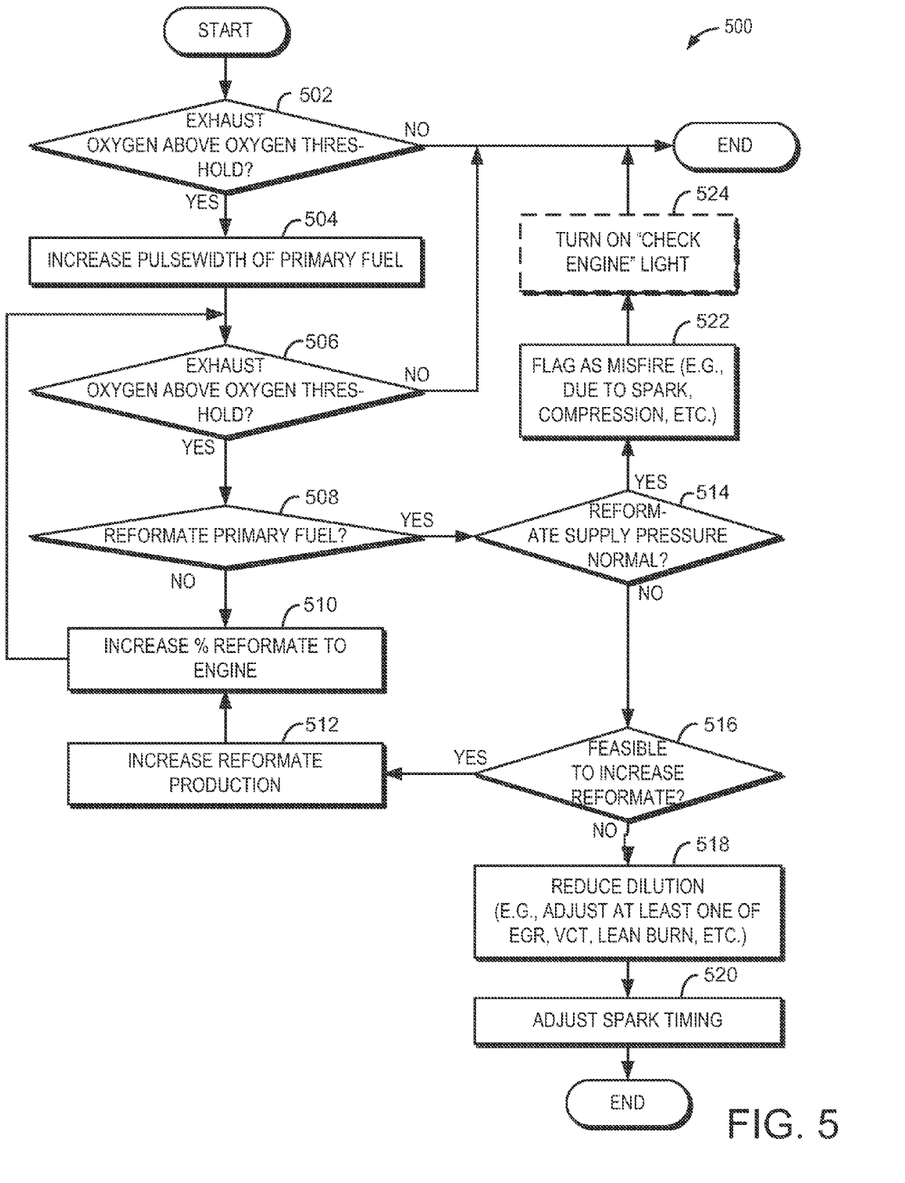
FIG. 5 shows an example routine for responding to an increased amount of exhaust oxygen in an example engine including a reformate system.

Referring now to FIG. 5, an example routine for responding to an increased amount of exhaust gas oxygen is shown. Routine 500 may be executed when both gaseous reformate and liquid fuel are supplied to engine cylinders.

Routine 500 starts at 502 where it is judged whether or not oxygen concentration in engine exhaust gases is above a threshold oxygen concentration level. In one example, the exhaust gas oxygen concentration may be determined from an exhaust gas oxygen concentration sensor, a universal exhaust gas concentration sensor for example. If the oxygen concentration in engine exhaust gases is higher than a threshold oxygen concentration, routine 500 proceeds to 504. Otherwise, routine 500 proceeds to exit.

At 504, routine 500 attempts to increase the amount of a primary fuel delivered to an engine cylinder by increasing an electrical pulse width of a signal applied to a fuel injector. As the amount of fuel supplied to a cylinder increases, the amount of excess oxygen present in engine exhaust gases may decrease. Further, increasing the fuel amount may drive the cylinder air-fuel mixture toward a desired cylinder air-fuel ratio, thereby improving engine emissions. Routine 500 proceeds to 506 after the primary fuel amount is increased.

In one example, the primary fuel may be designated as the liquid fuel. In another example, the primary fuel may change depending on engine operating conditions. For example, during a cold engine start the primary fuel may be reformate while during a hot engine start the primary fuel may be liquid fuel. In yet another example, the primary fuel may be based on the fuel comprising the highest fuel fraction of fuel in a cylinder air-fuel mixture, based on either mass or heating value of fuel. For example, if an air-fuel mixture is comprised of 85% liquid fuel and 15% gaseous reformate, the primary fuel is liquid fuel. Likewise, if an air-fuel mixture is comprised of 65% gaseous reformate and 35% liquid fuel, the primary fuel is reformate.

At 506, routine 500 judges whether or not exhaust gas oxygen concentration is greater than a threshold oxygen concentration level. The oxygen concentration may be detected by a wide range oxygen sensor (e.g., a universal exhaust gas oxygen sensor UEGO) placed in the exhaust path downstream of engine cylinders. The oxygen sensor signal may be processed by an engine controller to determine the air-fuel ratio at which engine cylinders are operating. If the oxygen concentration of engine cylinders is greater than a predetermined threshold oxygen concentration, routine 500 proceeds to 508. Otherwise, routine 500 proceeds to exit.

In addition, if liquid fuel is the primary fuel and increasing the liquid fuel injector pulse width does not reduce the exhaust gas oxygen concentration, the flow of liquid fuel to the engine may be deactivated by stopping a fuel pump or by deactivating fuel injectors. Further, the flow of reformate to the engine may be increased in proportion to the amount of liquid fuel that is not injected. Alternatively, the liquid injectors could be shut-down for only the cylinders exhibiting oxygen concentrations higher than a predetermined level, and those cylinders could be operated solely with reformate.

At 508, routine 500 judges whether or not reformate is the primary engine fuel. In one example, reformate may be judged to be the primary fuel if it comprises more than 50% of the mass or heating value of fuel entering engine cylinders. The mass and/or heating value of reformate entering an engine cylinder may be determined from the amount of time a fuel injector injecting reformate is open as well as from the temperature and the pressure of reformate. The total mass and/or heating value of fuel entering a cylinder may be determined from the times that both liquid fuel injectors and gaseous fuel injectors are open during a cylinder or engine cycle. If routine 500 judges that reformate is the primary fuel, routine 500 proceeds to 514. Otherwise, routine 500 proceeds to 510.

At 510, routine 500 increases the amount of reformate injected to engine cylinders. In one example, the time injectors are open during a cylinder cycle is increased to increase the amount of reformate entering engine cylinders. In another example, the pressure at which reformate is delivered to engine cylinders may be increased while injection timing remains the same. Thus, the amount of reformate delivered to engine cylinders is increased by increasing the reformate flow rate. Routine 500 returns to 506 after the amount of reformate delivered to engine cylinders is increased.

At 514, routine 500 assesses pressures in the reformate system to determine if pressures are in range. In one example, reformate system pressures may vary as the reformer becomes operational. For example, when the reformer is initially started reformer pressures may be at a low level. As the reformer continues to operate, reformer pressures increase until operating pressures are reached. Thus, the desired reformer pressures may start at a first pressure when the reformer is first started and then increase or decrease until the reformer reaches operating conditions. If one of the pressures in the reformer system is less than a first threshold pressure or greater than a second threshold pressure during reformer operation, it may be judged that the reformate pressure is not in range. If a pressure in the reformer system is not in range, routine 500 proceeds to 516. Otherwise, routine 500 proceeds to 522. The pressures in the reformate system may include storage tank pressure, fuel line pressure, pressure in the reformer, pressure in a heat exchanger, vaporizer pressure, and fuel supply pressure. Further, the range of desirable reformate pressure may vary with reformer and engine operating conditions. For example, if the reformer is started and the engine is idling, the desired and actual reformate pressures may rise at a first rate. However, if the reformer is started and the engine is operating at higher engine speeds and torques, the desired and actual reformate pressures may rise at a second rate, higher than the first rate.

At 516, routine 500 judges whether or not it is feasible to increase the rate at which reformate is produced by the fuel reformer. In one example, if the fuel reformer is operating at warmed-up operating temperatures and pressures and the rate reformate is produced is less than a threshold rate, it may be determined that the rate of reformate generation may not be increased and routine 500 proceeds to 518. However, if the fuel reformer is operating at temperatures and pressures that are less than threshold temperatures and pressures, routine 500 may choose to increase reformate production by proceeding to 512.

At 512, routine 500 increases reformate production. In one example, reformate production may be increased by increasing reformer temperature. Reformer temperature may be increased by at least one of increasing exhaust gas flow to the reformer and operating the engine at a higher load and operating the engine with additional spark retard. In another example, fuel reformer output may be adjusted by increasing one or more of the reformer operating pressures. For example, the pressure in the fuel reformer (e.g., 234 of FIG. 2) may be adjusted by adjusting positions of one or more valves (e.g., valves 228, 242, and/or 244). Thus, reformate production can be controlled by controlling fuel flow into and out of the fuel reformer. Further, reformate production can be controlled by adjusting temperatures and pressures in the reformate system.

At 518, routine 500 decreases cylinder charge dilution. Cylinder charge dilution may be adjusted by changing valve timing, EGR, cylinder air-fuel ratio, etc. For example, an amount of intake and exhaust valve overlap during a cylinder cycle may be decreased to reduce cylinder charge dilution. Further, engine air-fuel ratio may be richened to reduce cylinder charge dilution.

In some examples, the amount of liquid fuel injected to engine cylinders may be increased at 518. In particular, the amount of liquid fuel injected can be increased to richen the engine air-fuel ratio and so that a desired level of engine torque is produced. In one example, if a sudden change in reformer output is detected (e.g., a degraded fuel reformer condition), flow of reformate to the engine may be limited and the amount of liquid fuel injected may be increased such that the level of engine torque and exhaust air-fuel ratio present before the change in reformer output is maintained. In one example, the amount of increased liquid fuel may be determined by the change in hydrogen and hydrocarbons provided to the engine as a result of the change in reformer output. The estimated or determined change in hydrocarbons and hydrogen due to the reformer output may be compensated by increasing the mass of liquid hydrocarbons injected to the engine in proportion to the reduction in hydrocarbons due to the change in fuel reformer operating conditions.

At 518, routine 500 may gradually reduce reformate flow from said fuel reformer to said engine during a first degradation condition of said fuel reformer (e.g., fuel reformer temperature or pressure out of range, low fuel supply amount, reformer substrate degradation), immediately stop reformate flow from said fuel reformer to said engine during a second degradation condition of said fuel reformer (e.g., fuel supply or output pressure rate of change greater than a threshold rate of change, fuel reformer pressure rate of change greater than a threshold rate of change), and reduce an engine constituent (e.g., EGR, boost pressure, cylinder air amount, or fuel amount) in proportion to an amount of reformate flow reduced to said engine during said first and second degradation conditions of said fuel reformer. Further, routine 500 decreases reformate flow during an operator throttle tip-out during degradation of said fuel reformer. Since charge dilution is reduced as a result of less available reformate, the amount of reformate injected to the engine in response to an operator releasing or partially releasing an accelerator pedal (e.g., tip-out) may be reduced.

At 520, routine 500 adjusts spark timing to compensate for conditions when reformate is unavailable or limited. In one example, spark may be retarded proportionate to the reduction in reformate from when the desired amount of reformate is available to the engine. Further, the amount of spark advance may be limited according to the adjusted valve timings, EGR amount, and engine air-fuel ratio conditions set at 518. Routine 500 proceeds to exit after spark timing is adjusted.

At 522, routine 500 identifies and flags a condition of exhaust gas oxygen concentration as being related to spark, compression, or dilution. In one example, a bit may be set in the memory of an engine controller to identify the source of exhaust gas oxygen. Further, the higher level of exhaust oxygen may be attributed to an engine misfire. Routine 500 proceeds to 524 after higher levels of exhaust oxygen are flagged at 522.

At 524, routine 500 illuminates a light on an operator panel. In one example, the light may be a check engine light. Routine 500 proceeds to exit after illuminating the driver indication light.

Figure 6:
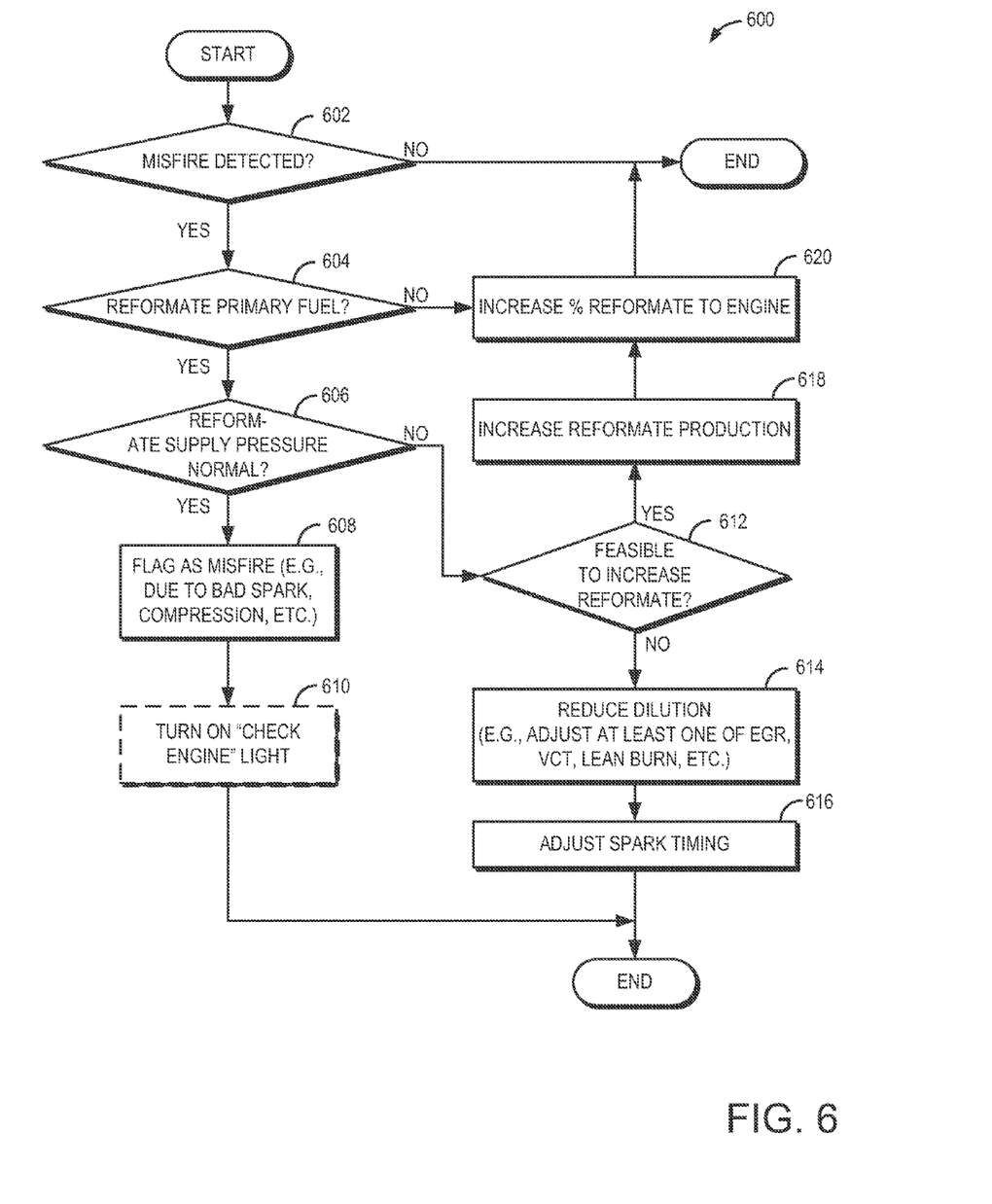
FIG. 6 shows an example routine for responding to misfire in an example engine including a reformate system.

Referring now to FIG. 6, an example routine for responding to engine misfire is shown. Routine 600 begins at 602 where routine 600 judges whether or not a misfire has been detected. In one example, an engine misfire may be determined from the rate of change in engine speed or crankshaft acceleration. For example, if engine speed between cylinder combustion events changes (e.g., decreases) by more than a predetermined amount, it may be judged that an engine misfire has occurred. In another example, a cylinder misfire may be determined from cylinder pressure. For example, if cylinder pressure does not reach a predetermined pressure, it may be judged that a misfire has occurred. If routine 600 has judged that a misfire has occurred, routine 600 proceeds to 604, otherwise routine 600 proceeds to exit.

At 604, routine 600 judges whether or not reformate is the primary engine fuel. In one example, reformate may be judged to be the primary fuel if it comprises more than 50% of the mass for heating value of fuel entering engine cylinders. The mass and/or heating value of reformate entering an engine cylinder may be determined from the amount of time a fuel injector injecting reformate is open as well as from the temperature and the pressure of reformate. The total mass and/or heating value of fuel entering a cylinder may be determined from the times that both liquid fuel injectors and gaseous fuel injectors are open during a cylinder or engine cycle. If routine 600 judges that reformate is the primary fuel, routine 600 proceeds to 606. Otherwise, routine 600 proceeds to 620.

At 606, routine 600 assesses pressures in the reformate system to determine if pressures are in range. In one example, reformate system pressures may vary as the reformer becomes operational. For example, when the reformer is initially started reformer pressures may be at a low level. As the reformer continues to operate, reformer pressures increase until operating pressures are reached. Thus, the desired reformer pressures may start at a first pressure when the reformer is first started and then increase or decrease until the reformer reaches operating conditions. If one of the pressures in the reformer system is less than a first threshold pressure or greater than a second threshold pressure during reformer operation, it may be judged that the reformate pressure is not in range. If a pressure in the reformer system is not in range, routine 600 proceeds to 612. Otherwise, routine 600 proceeds to 608. The pressures in the reformate system may include storage tank pressure, fuel line pressure, pressure in the reformer, pressure in a heat exchanger, vaporizer pressure, and fuel supply pressure. Further, the range of desirable reformate pressure may vary with reformer and engine operating conditions. For example, if the reformer is started and the engine is idling, the desired and actual reformate pressures may rise at a first rate. However, if the reformer is started and the engine is operating at higher engine speeds and torques, the desired and actual reformate pressures may rise at a second rate, higher than the first rate.

At 608, routine 600 identifies and flags a condition of engine misfire as being related to spark, compression, or dilution. Various sensors may be used to identify the source of misfire. For example, an ion sensor may detect a low energy spark or a valve position sensor may indicate undesirable valve timing or EGR rate. In one example, a bit may be set in the memory of an engine controller to identify the source of engine misfire. Routine 600 proceeds to 610 after misfire is flagged at 608.

At 610, routine 600 illuminates a light on an operator panel. In one example, the light may be a check engine light. Routine 600 proceeds to exit after illuminating the driver indication light.

At 612, routine 600 judges whether or not it is feasible to increase the rate at which reformate is produced by the fuel reformer. In one example, if the fuel reformer is at warmed-up operating temperatures and pressures and the rate reformate is produced is less than a threshold rate, it may be determined that the rate of reformate generation may not be increased and routine 600 proceeds to 614. However, if the fuel reformer is operating at temperatures and pressures that are less than threshold temperatures and pressures, routine 600 may choose to increase reformate production by proceeding to 618.

At 614, routine 600 decreases cylinder charge dilution. Cylinder charge dilution may be adjusted by changing valve timing, EGR, and/or cylinder air-fuel ratio. For example, an amount of intake and exhaust valve overlap during a cylinder cycle may be decreased to reduce cylinder charge dilution. Further, engine air-fuel ratio may be richened to reduce cylinder charge dilution.

In some examples, the amount of liquid fuel injected to engine cylinders may be increased at 614. In particular, the amount of liquid fuel injected can be increased to richen the engine air-fuel ratio and so that a desired level of engine torque is produced. In one example, if a sudden change in reformer output is detected (e.g., a degraded fuel reformer condition), flow of reformate to the engine may be limited and the amount of liquid fuel injected may be increased such that the level of engine torque and exhaust air-fuel ratio present before the change in reformer output is maintained. In one example, the amount of increased liquid fuel may be determined by the change in hydrogen and hydrocarbons provided to the engine as a result of the change in reformer output. The estimated or determined change in hydrocarbons and hydrogen due to the reformer output may be compensated by increasing the mass of liquid hydrocarbons injected to the engine in proportion to the reduction in hydrocarbons due to the change in fuel reformer operating conditions.

At 614, routine 600 may gradually reduce reformate flow from said fuel reformer to said engine during a first degradation condition of said fuel reformer (e.g., fuel reformer temperature or pressure out of range, low fuel supply amount, reformer substrate degradation), immediately stop reformate flow from said fuel reformer to said engine during a second degradation condition of said fuel reformer (e.g., fuel supply or output pressure rate of change greater than a threshold rate of change, fuel reformer pressure rate of change greater than a threshold rate of change), and reduce an engine constituent (e.g., EGR, VCT, boost pressure, cylinder air amount, or fuel amount) in proportion to an amount of reformate flow reduced to said engine during said first and second degradation conditions of said fuel reformer. Further, routine 600 decreases reformate flow during an operator throttle tip-out during degradation of said fuel reformer. Since charge dilution is reduced as a result of less available reformate, the amount of reformate injected to the engine in response to an operator releasing or partially releasing an accelerator pedal (e.g., tip-out) may be reduced.

At 616, routine 600 adjusts spark timing to compensate for conditions when reformate is unavailable or limited. In one example, spark may be retarded proportionate to the reduction in reformate from when the desired amount of reformate is available to the engine. Further, the amount of spark advance may be limited according to the adjusted valve timings, EGR amount, and engine air-fuel ratio conditions set at 614. Routine 600 proceeds to exit after spark timing is adjusted.

At 618, routine 600 increases reformate production. In one example, reformate production may be adjusted by increasing reformer temperature. Reformer temperature may be increased by at least one of increasing exhaust gas flow to the reformer and operating the engine at a higher load and operating the engine with additional spark retard. In another example, fuel reformer output may be adjusted by increasing one or more of the reformer operating pressures. For example, the pressure in the fuel reformer (e.g., 234 of FIG. 2) may be increased by adjusting positions of one or more valves (e.g., valves 228, 242, and/or 244). Thus, reformate production can be controlled by controlling fuel flow into and out of the fuel reformer. Further, reformate production can be controlled by adjusting temperatures and pressures in the reformate system.

At 620, routine 600 increases the amount of reformate injected to engine cylinders. In one example, the time injectors are open during a cylinder cycle is increased to increase the amount of reformate entering engine cylinders. In another example, the pressure at which reformate is delivered to engine cylinders may be increased while injection timing remains the same. Thus, the amount of reformate delivered to engine cylinders is increased by increasing the reformate flow rate. Routine 600 exits after the amount of reformate delivered to engine cylinders is increased.

Figure 7:
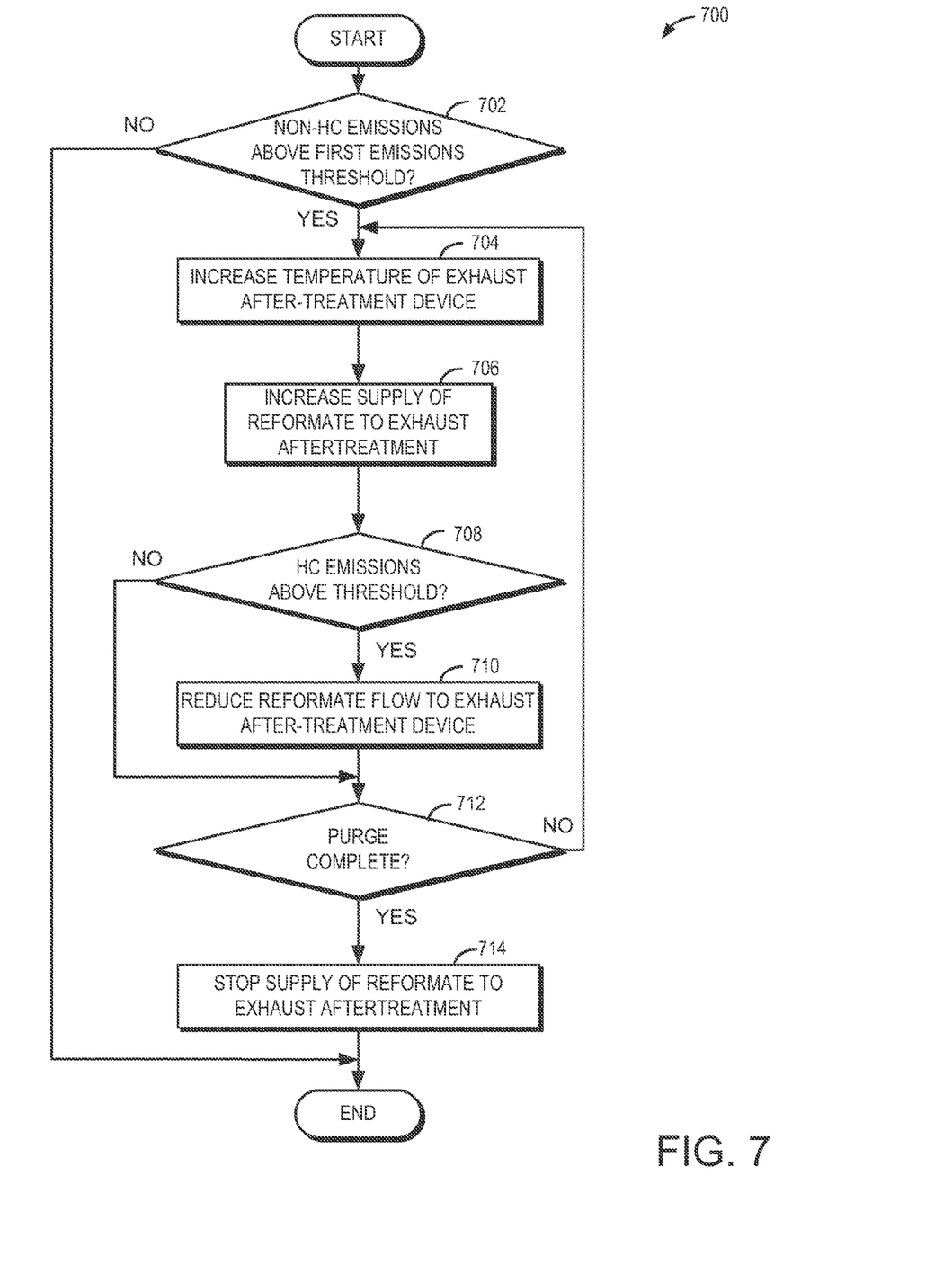
FIG. 7 shows an example routine for controlling engine emissions.

Referring now to FIG. 7, an example routine for controlling engine emissions of a vehicle with a fuel reformer is shown. Routine 700 begins at 702 where routine 700 judges if non-hydrocarbon engine emissions are greater than a threshold level. In one example, routine 700 determines if tailpipe $NO_X$ is greater than a predetermined level. If it is judged that $NO_X$ is greater than a predetermined level, routine 700 proceeds to 706. Otherwise, routine 700 proceeds to exit.

At 704, routine 700 increases the temperature of an exhaust gas after treatment device. In one example, the temperature of an exhaust gas after treatment device may be increased by adjusting fuel injection timing. For example, fuel may be injected later in a cylinder cycle to increase exhaust gas temperatures. In another example, spark timing may be retarded to increase exhaust gas temperatures. Routine 700 proceeds to 704 after increasing the temperature of the exhaust gas after treatment device.

At 706, routine 700 starts supplying and/or increases an amount of reformate supplied to an exhaust gas after treatment device. In one example, reformate is supplied to the exhaust system at a location upstream of a $NO_X$ trap. Further, the flow rate and amount of reformate supplied to the $NO_X$ trap may be regulated by a valve located between the fuel reformer outlet and the exhaust system. For example, the rate that reformate is supplied to the exhaust system is adjusted by varying the duty cycle of a signal applied to the control valve. If additional reformate is required the duty cycle is increased. If less reformate is required the duty cycle is decreased. Routine 700 proceeds to 708 after increasing the amount of reformate supplied to the exhaust after treatment device.

At 708, routine 700 judges whether or not hydrocarbon emissions downstream of an after treatment device are greater than a threshold amount. In one example, the exhaust hydrocarbon concentration may be determined from an oxygen sensor or from a hydrocarbon sensor. If the exhaust gas hydrocarbons are above a threshold amount it may be judged that an exhaust gas constituent (e.g., $NO_X$) has been purged from the after treatment device. Alternatively, if exhaust gas hydrocarbons are above a threshold level it may be judged that the after treatment device is not at operating temperature or operating in a degraded condition. If exhaust system hydrocarbon emissions are above a threshold level, routine 700 proceeds to 710. Otherwise, routine 700 proceeds to 712.

At 710, routine 700 reduces the amount of reformate supplied to an exhaust gas after treatment device. In one example, reformate is reduced in proportion to the concentration of hydrocarbons observed downstream of the exhaust gas after treatment device. Routine 700 proceeds to 712 after an amount of hydrocarbons delivered to the exhaust system is reduced.

At 712, routine 700 judges whether or not the after treatment device is purged of stored exhaust gas constituents. In one example, an exhaust gas after treatment device may be judged to be purged of stored exhaust constituents in response to a temperature of the exhaust gas after treatment device. In another example, an exhaust gas after treatment device may be judged to be purged of stored exhaust constituents in response to an oxygen concentration in exhaust gases downstream of the exhaust gas after treatment device. In yet other examples, an exhaust gas after treatment device may be judged to be purged of stored exhaust constituents in response to a purge time or an amount of reformate supplied for purging. If routine 700 judges purging complete, routine 700 proceeds to 714. Otherwise, routine 700 returns to 704.

At 714, routine 700 stops the flow of reformate to the exhaust system and exhaust after treatment device. Reformate flow may be stopped by closing a valve or by deactivating the fuel reformer. Routine 700 proceeds to exit after flow of reformate to the exhaust system is stopped.

As will be appreciated by one of ordinary skill in the art, routines described in FIGS. 3-7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method of operating an engine, comprising:
    reducing reformate flow to said engine in proportion to a proportion of reformate produced by a fuel reformer in response to reformer degradation including a fuel composition below a fuel composition threshold;
    reducing an engine constituent proportionate to said reducing reformate flow; and
    increasing a liquid fuel amount delivered to said engine to maintain engine torque and an engine air-fuel ratio prior to said reducing reformate flow.

2. The method of claim 1, where said engine constituent is a cylinder dilution amount or an amount of boost.

3. The method of claim 1, where said degradation includes a symptom of lean or rich engine air-fuel or a fuel correction amount greater than a predetermined amount.

4. The method of claim 1, where said degradation includes a reformate system pressure less than a first pressure threshold or greater than a second pressure threshold.

5. The method of claim 4, further comprising indicating said pressure less than said first pressure threshold or greater than said second pressure threshold via a pressure sensor measuring at least one of a reformate system cooler, vaporizer, reformer, buffer tank, gaseous injector and a reformate supply line coupled intermediate reformate system components.

6. The method of claim 1, where said degradation includes a temperature of a reformate system component less than a first temperature threshold or greater than a second temperature threshold.

7. The method of claim 6, further comprising indicating said temperature less than said first temperature threshold or greater than said second temperature threshold via a temperature sensor measuring at least one of a reformate system cooler, vaporizer, reformer, buffer tank, gaseous injector and a reformate supply line coupled intermediate reformate system components.

8. The method of claim 1, further comprising, indicating said fuel composition below said fuel composition threshold via a fuel composition sensor measuring chemical composition of fuel in at least one of a liquid fuel tank, buffer tank, reformer, gaseous fuel injector, liquid fuel injector, and fuel line coupling fuel system components.

9. The method of claim 1, where reducing flow of reformate to said engine includes limiting injection of reformate via a gaseous fuel injector.

10. The method of claim 1, where reducing reformate flow to said engine includes at least one of limiting flow of liquid fuel from a fuel tank to the reformer, limiting flow between reformate system components, and limiting flow of exhaust gas to the reformer.

11. A method for an engine, comprising:
    a first mode including operating an engine at a first speed and load, injecting gaseous reformate to said engine, injecting liquid fuel to said engine in a first amount and combusting an air-fuel mixture comprising said gaseous reformate and liquid fuel;
    a second mode including operating said engine at substantially said first speed and load, a degradation of a reformate system, limiting injecting of said gaseous reformate, injecting said liquid fuel in a second amount greater than said first amount, and combusting at a second air-fuel mixture comprising at least said liquid fuel; and
    a third mode including, a misfire of a cylinder in said engine, and increasing an amount of gaseous reformate delivered to said engine over the first amount injected in said first mode.

12. The method of claim 11, where the second mode further comprises stopping flow of liquid fuel from a fuel tank to a fuel reformer.

13. The method of claim 11, where said degradation in the second mode includes a temperature sensor coupled to a reformer, said sensor indicating a temperature greater than a second temperature threshold.

14. The method of claim 11, where said degradation includes a pressure sensor coupled to a buffer tank, said sensor indicating a pressure greater than a second pressure threshold.

15. The method of claim 11, where said degradation includes a fuel composition sensor coupled to a liquid fuel tank, said sensor indicating a fuel composition below a composition threshold.

16. The method of claim 11, where said misfire is indicated by a lean or rich air-fuel ratio or by a change in engine speed or by a change in crankshaft acceleration.

17. A system for operating an engine with a fuel reformer, comprising:
    a fuel reformer;
    a pressure sensor in communication with said fuel reformer;
    a temperature sensor in communication with said fuel reformer;
    a fuel composition sensor in communication with said fuel reformer; and
    a controller with instructions to gradually reduce reformate flow from said fuel reformer to said engine during a first degradation condition of said fuel reformer, immediately stop reformate flow from said fuel reformer to said engine during a second degradation condition of said fuel reformer, reduce an engine constituent in proportion to an amount of reformate flow reduced to said engine during said first and second degradation conditions of said fuel reformer, and decrease reformate flow during an operator throttle tip-out during degradation of said fuel reformer.

* * * * *